United States Patent [19]

Papak

[11] Patent Number: 5,044,323
[45] Date of Patent: Sep. 3, 1991

[54] TETHERING DEVICE WITH LOCKING MEANS

[76] Inventor: Don J. Papak, 3478 Woodland, Windsor, Ontario, Canada, N9E 1Z7

[21] Appl. No.: 588,743

[22] Filed: Sep. 27, 1990

Related U.S. Application Data

[63] Continuation-in-part of Ser. No. 424,866, Oct. 20, 1989, Pat. No. 4,982,701.

[51] Int. Cl.$^5$ .............................................. A01K 3/00
[52] U.S. Cl. .................................... 119/121; 248/156
[58] Field of Search ............... 119/117, 121, 122, 123, 119/124; 52/155, 156, 157, 165; 248/156, 131

[56] References Cited

U.S. PATENT DOCUMENTS

| | | | |
|---|---|---|---|
| 762,645 | 6/1904 | May ........................................ | 52/156 |
| 1,699,308 | 1/1929 | Postings ........................... | 119/117 X |
| 2,746,208 | 5/1956 | Lewis ............................... | 248/156 X |
| 3,189,004 | 6/1965 | Sinclair ............................... | 119/124 |
| 3,508,525 | 4/1970 | Sawyer ............................... | 119/117 |
| 3,658,037 | 4/1972 | Hunter ............................. | 119/117 X |
| 4,060,244 | 11/1977 | Graham .............................. | 119/124 |
| 4,334,503 | 6/1982 | Carey, Jr. ............................ | 119/121 |
| 4,738,222 | 4/1988 | Terry et al. ......................... | 119/117 |

OTHER PUBLICATIONS

"Tangleproof Dog Tethers . . . ", *Popular Mecahnics*, May 1955, p. 166.

*Primary Examiner*—Robert P. Swiatek
*Assistant Examiner*—Todd E. Manahan
*Attorney, Agent, or Firm*—Allen D. Gutchess, Jr.

[57] ABSTRACT

An animal tethering device is disclosed which includes a tubular member placed in the ground in a more-or-less permanent position. A rod-like member or restraint stake to which a flexible line can be connected is inserted in the tubular member with a flexible line attached to tie an animal. The tubular member has an upper collar extending outwardly from an upper end portion thereof for visibility. The rod-like member has a rain cap which is received over the upper extremity of the tubular member and substantially prevents entry of water thereinto. A bearing surface is also established between the rain cap and the tubular member to reduce the possibility of entanglement. The upper end of the tubular member has a spiral ridge on the outer surface thereof and the rain cap has an inwardly-extending projection engagable with the ridge. The rod-like member then must be turned relative to the tubular member when being fully inserted into the tubular member or being removed therefrom, making accidental removal of the rod-like member difficult.

6 Claims, 2 Drawing Sheets

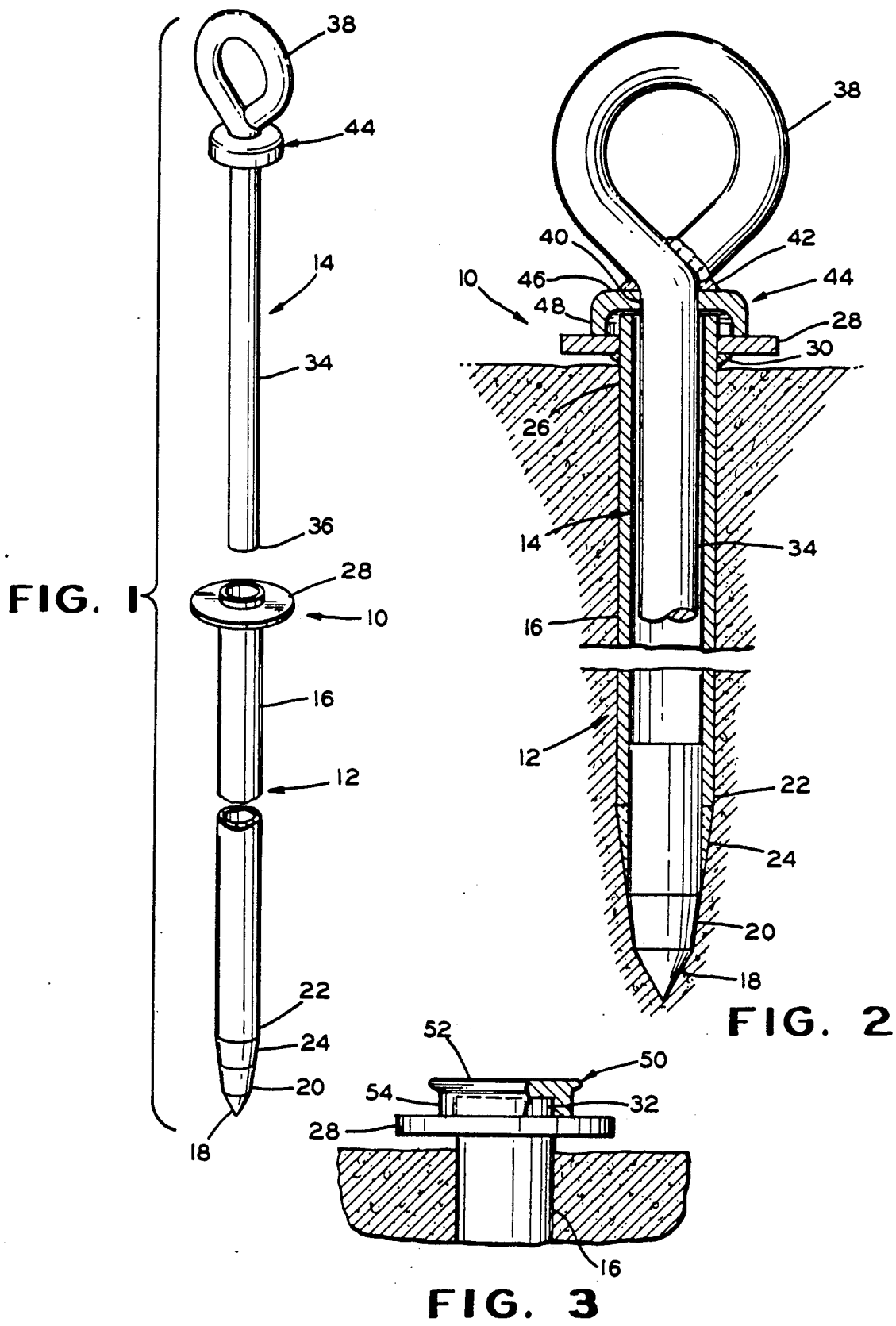

TETHERING DEVICE WITH LOCKING MEANS

This application is a continuation-in-part of my copending application Ser. No. 07/424,866, filed on Oct. 20, 1989, now U.S. Pat. No. 4,982,701.

This invention relates to an animal restraint or tethering device of a water-resistant design with locking means.

The animal restraint in accordance with the invention includes a tubular metal member having a tapered or pointed end which is driven into the ground substantially to an upper collar on the member which is affixed to an upper end portion thereof. The collar is employed primarily for visibility to enable one to readily locate the member and it also can serve as a stop to prevent the member from being driven too far into the ground and making it difficult to remove. However, the collar is preferably slightly above ground level when the tubular member is in place. The upper extremity of the tubular member projects slightly above the flange, forming an upper, annular edge. Two or more of the tubular members can be located in desirable positions around a yard where an animal can be tied. The animal can then be treated to more than one area when it is tied up and wear and tear on the grass can be more widely distributed.

A restraint stake or rod-like member with an upper ring to which a flexible line is connected, with the animal attached to the other end, is placed in the tubular member and anchors the line without additional steps being required. The stake has a rain cap at the upper end, below the ring, which extends outwardly with a downwardly-extending annular flange. The diameter of the flange exceeds the diameter of the tubular member so that the cap is received over the upper extremity of the tubular member when in place on the member. The cooperation of the tubular member and the annular flange thereby substantially prevents entry of debris, dirt, and water into the tubular member. This prevents the stake from binding, especially if water in the tubular member would freeze. It also prolongs the life of the member, if made of material which may rust. The stake can also relatively easily rotate in the tubular member, with the rain cap flange riding on the upper surface of the collar of the member or on the upper end of the tubular member, to minimize the chance that the flexible line will become entangled with the stake.

It has been found that small children can physically remove the stake from the tubular member and set an animal free. It has also been found that a large dog or other animal can, on rare occasion, pull the stake up and out of the tubular member. To prevent such occurrences, an upper portion of the tubular member and the rain cap have locking means which prevent the stake from being removed from the tubular member without turning the stake and lifting upwardly thereon. In a preferred form, the locking means comprises a spiral ridge located on the outer surface of the upper portion of the tubular member and an inwardly-extending projection on the downwardly-extending annular flange of the rain cap which is engagable with the spiral ridge. To fully assemble the stake and the tubular member, the stake is moved downwardly until the projection engages the ridge and is turned to move the projection around and below the ridge and out of engagement therewith. To remove the stake, it is then raised until the projection engages the ridge and the stake is pulled upwardly and turned to move the projection upwardly and above the ridge. The spiral ridge can also be located on the inner surface of the downwardly-extending flange of the rain cap and the projection can be located on the upper portion of the tubular member. However, the former is preferred since it is easier to manufacture.

The animal restraint also includes a cap of plastic or other suitable resilient material which can be placed over the upper extremity of the tubular member when the stake is not in position, to keep out water.

An animal tether employing a female and a male member is shown in U.S. Pat. No. 3,658,037, issued Apr. 25, 1972. However, with that tether, water can readily enter the female component to cause deterioration of same. Further, a ring at the top of the male member rides on the upper edge of the female member and would resist rotatable movement of the male member.

It is, therefore, a principal object of the invention to provide an animal restraint of water and tangle-resistant, design.

Another object of the invention is to provide an animal restraint which includes a tubular member and a stake inserted therein which has a rain cap to resist entry of water into the tubular member and to facilitate rotation.

Other objects and advantages of the invention will be apparent from the following detailed description of a preferred embodiment thereof, reference being made to the accompanying drawings, in which:

FIG. 1 is an exploded, fragmentary view in perspective of an animal restraint in accordance with the invention;

FIG. 2 is an enlarged, fragmentary view in vertical cross section of the animal restraint of FIG. 1, shown in assembled relationship and in position in the ground;

FIG. 3 is a somewhat schematic view of part of the animal restraint with a cap placed over the upper end thereof;

Figure 4:
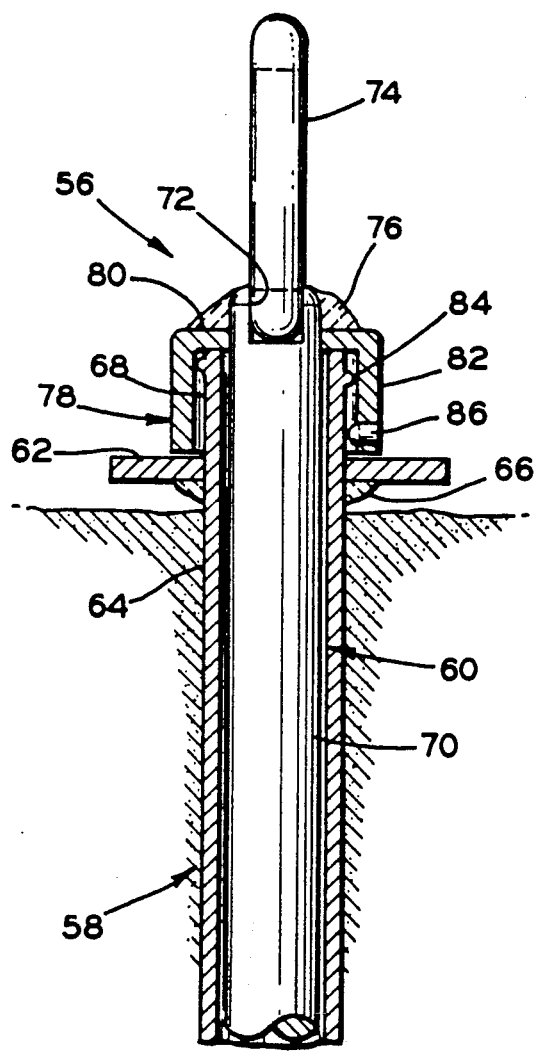
FIG. 4 is a fragmentary view in vertical cross section of a modified animal restraint with locking means, shown in assembled relationship and in position in the ground.

Referring to the drawings, an animal restraint embodying the invention is indicated at 10 and includes a female component or tubular member 12 and a male component or stake 14. The tubular member 12 includes a metal or plastic tube 16 having a tapered or pointed end 18 formed by a pointed metal body 20 which can be affixed to a lower end 22 of the tubular member 12 by weld metal 24 or adhesive. The body 20 provides a damage-resistant lower end when the tubular member 12 is driven into the ground. An upper end portion 26 has an outwardly-extending annular collar or flange 28 which is affixed to the end portion 26 by weld metal 30 or other suitable means. An upper extremity 32 of the tubular member projects above the flange 28 and provides an upper annular edge for the tubular member.

The restraint stake 14 includes a long metal rod 34 which is smaller in diameter than the tube 16 and is shorter than the tube. This is a solid metal rod which has a lower, blunt end 36, with an upper ring 38 extending upwardly from an upper end 40. The ring is attached to an end of a suitable flexible line, in the form of a chain, cable, rope or the like, by a snap hook or other suitable means, as is well known in the art. The animal is suitably attached to the other end of that line. Weld metal 42 or other suitable means affixes a rain cap 44 to the upper end 40 of the rod 34. The rain cap 44 includes an outwardly-extending, annular portion 46 terminating in a downwardly-extending, annular flange or lip 48, the inner diameter of which exceeds the outer diameter of the tubular member 12.

When the stake 14 is in position, the annular flange 48 is deep enough that the lower edge thereof preferably rests directly on the upper surface of the collar 28, with the annular portion 46 of the rain cap being slightly above the upper extremity 32 of the tubular member 12. This provides a reasonably tight seal to restrict the seepage of water under the rain cap 44 and into the upper extremity 32 of the tube, even in a driving rain. However, the rain cap 44 can be supported on the upper end of the tubular member 12. Further, the rain cap 44 provides a positive stop for the stake 14 and enables the stake 14 to rotate more easily relative to the tubular member 12, with the flange 48 riding on the collar 28 or the cap riding on the upper end of the tubular member 12 as the stake 14 turns. This minimizes the chance for the flexible line to become entangled with the stake ring.

When the tubular member is driven into the ground, it preferably is positioned so that the collar 28 is slightly above the surface of the ground yet not high enough to allow the upper extremity 32 to interfere with the blade of the mower. The slightly raised position of the collar 28 also enhances visibility of the tubular member and decreases the possibility of ground water seeping over the tubular extremity 32 and into the interior of the tubular member 12. With the elevated position of the collar 28, a suitable tool can also be more readily placed under the collar to raise the tubular member 12 from the ground from time-to-time to install it in a new position.

When it is desired to tie the animal at a different location where another one of the tubular members 12 is located, it is simple to accomplish this. The stake 14 is lifted out of the tube 16 by the ring 38 and simply inserted in the other tubular member without the need for untying the flexible line from either the stake 14 or the animal.

When the stake 14 is removed from the tubular member so that the upper end is open, a suitable cap 50, preferably of slightly resilient material such as plastic or rubber, is placed over the upper extremity 32 of the tube 16 and snugly held by a friction fit. The cap 50 includes a circular top 52 and an annular flange 54, the inner diameter of which is preferably slightly less than the outer diameter of the extremity 32 to provide the secure fit thereon.

In one preferred form of the invention, by way of illustration, the tube 16, including the metal tip 20, has an overall length of nineteen inches, with the tube 16 having an inner diameter of nine-sixteenths inch and an outer diameter of thirteen-sixteeths inch. The rod 34 of the stake 14 has an overall length of eight and one-quarter inch and a diameter of one-half inch. The extremity 32 of the tube 16 extends one-quarter inch above the upper surface of the collar 28. The rod 34 should have a length of approximately at least one-half of the length of the tube 16, not counting the tip 20, so that the stake 14 cannot be pulled out of the tubular member by the restrained animal. In any event, the length of the rod should be less than the length of the tube.

Figure 5:
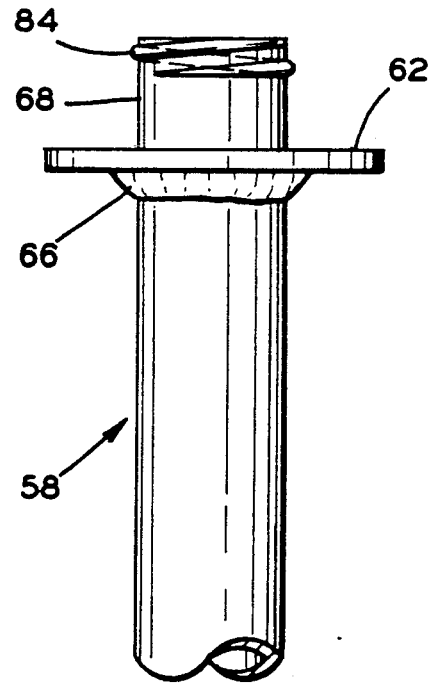
FIG. 5 is a fragmentary side view in elevation of a tubular member of the restraint of FIG. 4.

A modified animal restraint or tethering device embodying the invention is indicated at 56 in FIGS. 4 and 5. A female component or tubular member 58 receives a male component or stake 60. The tubular member 58 can be similar to the tubular member 12 and includes an outwardly-extending, annular collar or flange 62 at an upper end portion 64 with the collar being affixed by weld metal 66 or other suitable means. An upper extremity 68 of the upper end portion 64 projects above the flange 62 and provides an upper annular edge on the tubular member.

The restraint stake 60 includes a long rod 70 which is shorter than the tube and, as shown, is a solid metal rod similar to the metal rod 34 of the restraint stake 14. In this instance, the upper end of the rod 70 has a notch 72 which receives a portion of a connecting means or ring 74 to which is attached a flexible line, with an animal suitably attached at the other end of the line. Weld metal 76 or other suitable means affixes the ring 74 to the rod 70 and also affixes a rain cap 78 to the upper end of the rod 70. The rain cap 78 includes an outwardly-extending, annular portion 80 terminating in a downwardly-extending, annular flange or lip 82, the inner diameter of which exceeds the outer diameter of the tubular member 58.

When the stake 60 is assembled, the annular flange 82, in this instance, is slightly shorter than the upper extremity 68 of the upper end portion 64 of the tubular member 58. With this arrangement, the lower surface of the annular portion 80 of the rain cap 78 contacts the upper edge of the upper extremity 68 of the tubular member 58. This provides a reasonably tight seal to restrict the seepage of water under the rain cap 78 yet enables the stake 60 to rotate relative to the member 58.

In accordance with this embodiment, the tethering device 56 has cooperating locking means for preventing the stake 60 from being easily removed from the tubular member 58. More specifically, the upper extremity 68 of the tubular member 58 has an external thread or spiral ridge 84 formed thereon and extending around the outer surface of the upper extremity 68 at least one turn. An inwardly-extending projection 86 is affixed to the annular flange 82 of the rain cap 78 at a lower portion thereof, so that the projection 86 is below and out of contact with the spiral ridge 84 when the stake 60 is fully assembled in the tubular member 58.

To fully insert the stake 60 in the tubular member, the stake is lowered until the projection 86 contacts the spiral ridge 84. The stake is then turned clockwise, in this instance, so that the projection 86 rides along the ridge and then drops below it. In the normal operating position of the tethering device, the stake 60 is free to rotate in the tubular member 58, as is true of the tethering device 10. However, the stake 60 cannot be removed from the tubular member 58 without raising the stake and then turning it counterclockwise until the projection 86 moves above the spiral ridge 84, at which time the stake can be lifted directly upwardly.

The above engagable locking arrangement prevents small children from easily physically removing the stake and also prevents a large dog or other animal from possibly pulling it up and out of the tubular member, as has heretofore been possible. The locking arrangement also limits movement of the rain cap 78 up and away from the collar 62 to minimize the chance of the flexible line being caught therebetween.

The spiral ridge 84 and the projection 86 can be reversed with the ridge on the inner surface of the annular flange 82 and the projection extending outwardly from the upper extremity 68 of the tubular member 58. However, the embodiment as disclosed is preferable, particularly since it is easier to produce. The projection 86 is preferably perpendicular to the plane of the ring 74. An animal always pulls at the side of the ring and this could cause the clearance between the projection 86 and the upper extremity 68 to close and cause binding, if the projection were on the side of the ring 74 opposite the side of the pulling animal.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. An animal tethering device comprising a tubular member, an elongate rod-like member of a size to fit within said tubular member and having a length less than the length of said tubular member, a rain cap affixed to an upper end portion of said rod-like member, said cap having an annular portion extending outwardly around said rod-like member and having an inner downwardly-extending, annular flange at an outer edge, said flange having a diameter exceeding the outer diameter of said tube, said rod-like member having connecting means extending above the upper end thereof and above said cap to receive an end of a flexible member for restraining an animal, one of an outer surface of an upper portion of said tubular member and an inner surface of said downwardly-extending flange of said rain cap having a spiral ridge extending at least one turn therearound, and the other of said downwardly-extending flange of said rain cap and the outer surface of the upper portion of said tubular member having a generally radially-extending projection engagable with said spiral ridge, whereby said rod-like member must be turned to enable said projection to move along and beyond said ridge in order to insert said rod-like member fully into said tubular member and to prevent removal of said rod-like member without turning and raising said rod-like member relative to said tubular member.

2. A tethering device according to claim 1 wherein an annular collar is affixed to an upper portion of said tubular member and said downwardly-extending flange of said rain cap having a diameter not exceeding the diameter of an outer edge of said annular collar.

3. An animal tethering device for tethering an animal in a given area about a central point in the ground, said device comprising a tubular member, said tubular member having an annular collar affixed at an upper end portion thereof and extending outwardly therefrom, said collar being spaced slightly above the ground, an upper extremity of said tubular member extending above said collar; an elongate, rod-like member having a diameter smaller than the inner diameter of said tubular member and having a length not substantially less than one-half the length of said tubular member, means affixed to the upper end of said rod-like member for receiving an end of a flexible line, a cap affixed to an upper end portion of said rod-like member below said means, said cap having an annular portion extending outwardly from said rod-like member and having a downwardly-extending flange at its outer edge, said flange having a diameter exceeding the outer diameter of said tubular member, but not exceeding the diameter of said collar, the upper portion of said tubular member above said collar having a spiral ridge on an outer surface extending at least one turn therearound, and said downwardly-extending flange of said cap having an inwardly-extending projection engagable with said ridge, whereby said rod-like member must be turned and raised to enable said rod-like member to be removed from said tubular member when said rod-like member and said tubular member are fully assembled.

4. An animal tethering device for tethering an animal in a given area about a central point in the ground, said device comprising a tubular member, said tubular member having an annular collar affixed at an upper end portion thereof and extending outwardly therefrom, said collar being spaced slightly above the ground, an upper extremity of said tubular member extending above said collar; an elongate, rod-like member having a diameter smaller than the inner diameter of said tubular member and having a length less than the length of said tubular member, means affixed to the upper end of said rod-like member for receiving an end of a flexible line, a cap affixed to an upper end portion of said rod-like member below said means, said cap having an annular portion extending outwardly from said rod-like member and having a downwardly-extending flange at its outer edge, said flange having a diameter exceeding the outer diameter of said tubular member, but not exceeding the diameter of said collar, said tubular member and rod-like member having cooperating engagable means whereby said rod-like member must be turned relative to said tubular member to be fully inserted therein and to be removed therefrom.

5. An animal tethering device according to claim 4 wherein said cooperating engagable means comprises one of the outer surface of the upper end portion of said tubular member and an inner surface of said downwardly-extending flange of said cap having a spiral ridge, and extending at least one turn therearound, and the other of said inner surface of said downwardly-extending flange and the outer surface of the upper portion of said tubular member having a generally radially-extending projection engagable with said spiral ridge.

6. An animal tethering device according to claim 4 wherein said cooperating engagable means comprises a spiral ridge on an outer surface of the upper portion of said tubular member above said collar and extending at least one turn therearound, and an inwardly-extending projection on said downwardly-extending flange of said cap engagable with said ridge.

* * * * *